United States Patent
Henke (10) Patent No.: US 9,688,486 B2
(45) Date of Patent: Jun. 27, 2017

(54) DEVICE FOR CONVEYING AN OPERATING MATERIAL

(71) Applicant: HENKEL AG & CO. KGAA, Dusseldorf (DE)

(72) Inventor: Andreas Henke, Hellwege (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 14/654,048

(22) PCT Filed: Dec. 3, 2013

(86) PCT No.: PCT/EP2013/075387
§ 371 (c)(1),
(2) Date: Oct. 26, 2015

(87) PCT Pub. No.: WO2014/095349
PCT Pub. Date: Jun. 26, 2014

(65) Prior Publication Data
US 2016/0083200 A1 Mar. 24, 2016

(30) Foreign Application Priority Data
Dec. 20, 2012 (DE) .......... 10 2012 224 054

(51) Int. Cl.
*B65G 53/00* (2006.01)
*B65G 53/16* (2006.01)
(Continued)

(52) U.S. Cl.
CPC .......... *B65G 53/16* (2013.01); *B65G 53/12* (2013.01); *B65G 53/34* (2013.01); *G01F 11/282* (2013.01)

(58) Field of Classification Search
USPC .................. 406/132, 124, 125, 126
See application file for complete search history.

(56) References Cited

U.S. PATENT DOCUMENTS 2,707,132 A * 4/1955 Baresch ........... B65G 53/12
406/132
2,734,782 A * 2/1956 Galle ............. B65G 53/22
266/182

(Continued)

FOREIGN PATENT DOCUMENTS

EP 2241867 A1 10/2010
JP S578417 A 1/1982

(Continued)

OTHER PUBLICATIONS

International Search Report for PCT/EP2013/075387 dated Mar. 14, 2014.

*Primary Examiner* — Joseph Dillon, Jr.
(74) *Attorney, Agent, or Firm* — James E. Piotrowski (57) ABSTRACT

The invention relates to a device (1) for conveying an operating material, comprising a filling chamber (3) with an inlet (4) for filling the filling chamber (3) with the operating material, a conveying section (6) for conveying the operating material to an outlet (5), a transition element (7) between the filling chamber (3) and the conveying section (6) which can be switched between an open position and a closed position. The operating material which is introduced via the inlet (4) in the filling chamber (3), in the open position of the transition element (7), can be transferred in the conveying section (6) by means of a gaseous transport medium, and the operating material can be discharged from the outlet (5) from the conveying section (6) by means of a gaseous transport medium.

18 Claims, 5 Drawing Sheets

(51) Int. Cl.
*G01F 11/28* (2006.01)
*B65G 53/12* (2006.01)
*B65G 53/34* (2006.01)

(56) References Cited

U.S. PATENT DOCUMENTS

| | | | | |
|---|---|---|---|---|
| 2,817,561 A * | 12/1957 | Planiol | ................... | B65G 53/22 406/132 |
| 3,094,249 A * | 6/1963 | Pullen | ................... | B65G 53/46 222/509 |
| 3,432,208 A * | 3/1969 | Draper | ................... | B65G 53/22 406/132 |
| 3,827,610 A * | 8/1974 | Stiefel, Jr. | ............... | G01F 11/28 222/440 |
| 4,472,091 A * | 9/1984 | Callahan | ............ | B01F 11/0258 222/196 |
| 4,497,599 A * | 2/1985 | Benatar | ................... | B22D 1/00 222/149 |
| 4,502,819 A * | 3/1985 | Fujii | ...................... | B65G 53/22 406/132 |
| 4,674,922 A * | 6/1987 | Federhen | ........... | B65G 53/4691 137/240 |
| 5,490,745 A * | 2/1996 | Thiele | ................... | B65G 53/46 251/147 |
| 5,558,474 A * | 9/1996 | Wildon | ................. | B24C 7/0053 406/127 |
| 6,079,461 A * | 6/2000 | Fisher | ................... | B65G 53/06 141/1 |
| 6,722,294 B2 * | 4/2004 | Cabrera-Llanos | ... | G01G 13/028 110/101 C |
| 8,012,422 B2 * | 9/2011 | Yaluris | ................... | C10G 11/18 406/122 |
| 8,936,416 B2 * | 1/2015 | Stutz, Jr. | ................ | B65G 53/40 222/400.5 |
| 2004/0025762 A1 * | 2/2004 | Cabrera-Llanos | ... | G01G 13/028 110/104 R |
| 2010/0284768 A1 * | 11/2010 | Olin-Nunez | ............ | C03B 5/235 414/161 |
| 2011/0253257 A1 * | 10/2011 | Fass | ........................ | G01F 11/34 141/100 |

FOREIGN PATENT DOCUMENTS

| WO | 96/27551 A1 | 9/1996 |
|---|---|---|
| WO | 2009044224 A1 | 4/2009 |

* cited by examiner

DEVICE FOR CONVEYING AN OPERATING MATERIAL

CROSS-REFERENCE TO RELATED APPLICATION

This application is entitled to the benefit of and incorporates by reference subject matter disclosed in International Patent Application No. PCT/EP2013/075387 filed on Dec. 3, 2013 and German Patent Application 10 2012 224 054.3 filed Dec. 20, 2012.

TECHNICAL FIELD

The present invention relates to a device for conveying an operating material, in particular a granulate. These types of devices are used in particular for industrial applications in order to convey operating materials, such as granulates, for example, to their locations of use, such as processing stations or application units. One example of an application is in the field of packaging technology. Known devices are suited here in particular for feeding application units with hot melt adhesives in the form of a granulate. This granulate is then melted for application by the application units.

BACKGROUND

For example, EP 2241867 A1 discloses a device for filling processing stations with a pumpable operating material, wherein two or more transition chambers are associated with a central tank for the operating material, each transition chamber being associated with one of the processing stations in such a way that the operating material is initially conveyable from the central tank into the respective transition chamber, and from there to the particular associated processing station, wherein a pressure medium nozzle which is directed toward the transition chamber is provided for conveying the operating material to the processing stations.

The object of the invention is to provide an improved device for conveying an operating material.

SUMMARY

This object is achieved by a device for conveying an operating material, the device comprising a filling chamber having an inlet for filling the filling chamber with the operating material, a conveying section for conveying the operating material via an outlet, and a transition element from the filling chamber to the conveying section which is switchable between an open position and a closed position, wherein the operating material which is filled into the filling chamber through the inlet, in the open position of the transition element, is transferable into the conveying section by means of a gaseous transport medium, and wherein the operating material is dischargeable from the conveying section via the outlet by means of a gaseous transport medium.

The basic concept of the invention is the use of a device for conveying an operating material, such as a granulate, the device comprising a filling chamber having an inlet for filling the filling chamber with the granulate, a conveying section for conveying the granulate via an outlet, a transition element from the filling chamber to the conveying section, which is switchable between an open position and a closed position in order to make it possible, in particular in the open position of the transition element, to transfer the granulate from the filling chamber to the conveying section, wherein the granulate which is filled into the filling chamber through the inlet in the open position of the transition element is transferred into the conveying section by means of a gaseous transport medium, preferably compressed air, and wherein the granulate is discharged from the conveying section via the outlet by means of a gaseous transport medium, preferably compressed air.

In particular a granulate may be used as the operating material, as discussed above. A granulate may be understood in particular to mean a granular to powdery, in particular easily flowable, solid. In one alternative embodiment, however, generally pumpable operating materials which are miscible with a gaseous transport medium may also optionally be conveyed.

The use of an operating material in granulate form has proven to be particularly advantageous, since a granulate is easily conveyable by means of a gaseous transport medium. For example, a hot melt adhesive in granulate form is used which has applications in particular in packaging technology for producing cardboard boxes or similar packaging materials.

A storage container or a storage tank is preferably provided, in which the operating material is stored prior to conveying by the device. The storage container may also be part of the device itself.

The filling chamber may be used in particular for pre-portioning the operating material and/or as a temporary store. For this purpose, the filling chamber may in particular have means for detecting the quantity and/or the mass of operating material that is stored and supplied via the inlet. The operating material may, for example, pass through the inlet into the filling chamber by means of a gaseous transport medium. Filling as well as suction intake of the operating material are conceivable here. The inlet is preferably provided in the upper area of the filling chamber. The conveying section, which preferably adjoins the lower area of the filling chamber, which is separated from the filling chamber by the transition element, is provided for further conveying of the operating material. The conveying section may also be a section or portion preferably of the lower area of the filling chamber, which is separable from the filling chamber by means of the transition element. The transition element, as discussed above, is switchable at least between an open position and a closed position, wherein communication between the filling chamber and the conveying section is possible in the open position, and in particular transfer of the operating material, provided in the filling chamber, into the conveying section is possible. In the closed position, such a separation of the conveying section from the filling chamber is preferably once again made possible, so that in particular transfer of the operating material, provided in the filling chamber, into the conveying section is not possible.

The filling chamber is equipped with a first feed line for a gaseous transport medium, the first feed line preferably being situated in the upper area of the filling tower. For transferring the operating material into the conveying section, which preferably adjoins the lower area of the filling chamber, the inlet is preferably closed and the transition element is in the open position. The operating material is then transferable into the conveying section by feeding the gaseous transport medium.

In addition, the operating material may be discharged from the conveying section via the outlet by means of a gaseous transport medium, which may be the same gaseous transport medium as the transport medium described above, or which may be another and/or different transport medium.

The outlet of the device may be used in particular for connecting any peripheral applications to the device. Examples of conceivable peripheral applications are application stations or processing stations, switches, temporary stores, or further storage containers. The conveying section is [ ], and the granulate is discharged from the conveying section by means of a gaseous transport medium (preferably compressed air) via the outlet.

Compressed air may preferably be used as the gaseous transport medium for transferring and also for discharging. However, use of some other gas or gas mixture may also prove to be useful. In particular for reactive operating materials, use of an inert gas may prove to be appropriate.

In the preferred embodiment, the gaseous transport medium is introduced by the action of pressure on the filling chamber and/or the conveying section for transferring or for discharging. However, in one embodiment of the invention, the use of a vacuum system may prove to be appropriate, in which the gaseous transport medium, by means of action of a vacuum in particular on the conveying section, is used for transferring the operating material from the filling chamber into the conveying section, and/or the vacuum is used at the outlet for discharging the operating material from the conveying section via the outlet.

The device also preferably contains a control unit or is attached to a control unit. The control unit may be used in particular for controlling the individual components. It is conceivable in particular to control the transition element in such a way that it is in the closed position for filling the filling chamber with the operating material through the inlet, so that communication between the filling chamber and the conveying section is not possible. In addition, opening of an exhaust air opening of the filling chamber may be provided during filling in order to avoid back-pressure in the filling chamber and to allow the gaseous transport medium to be discharged during filling. In particular as soon as optionally used filling level sensors or filling quantity sensors which are attached to the control unit signal that a certain filling level or a certain filling quantity of granulate has been reached in the filling chamber, alternatively or additionally, closing of the inlet and/or the exhaust air opening and shifting the transition element into the open position may be provided to allow transfer of the operating material from the filling chamber to the conveying section. For this purpose, the feed line of the gaseous transport medium for transferring the operating material is preferably also controlled. In addition, the addition of a gaseous transport medium for discharging the operating material from the outlet may be controlled, in particular with respect to time.

Numerous advantages may be achieved in particular by using a gaseous transport medium for transferring the operating material from the filling chamber to the conveying section. In comparison to conventional devices, completely different designs are now also conceivable, since the operating material now is no longer supplied to the conveying section solely by gravity. Further advantages may be achieved, even in one preferred design in which the conveying section preferably adjoins the lower area of the filling chamber, so that it would be possible to make use of gravity in transferring the operating material. For example, the transfer speed may be increased, and in addition embodiments are conceivable in which the operating material present in the filling chamber is broken up and/or separated and/or mixed by the gaseous transport medium. In addition, cooling of the operating material by the gaseous transport medium may be made possible, for example by setting the gaseous transport medium to a desired temperature.

As discussed above, the same gaseous transport may be used for transferring operating material from the filling chamber into the conveying section, and for discharging the operating material from the outlet.

In one advantageous refinement of the present invention, however, it is provided to feed a first gaseous transport medium into the filling tower for transporting the granulate into the conveying section, and to feed a second gaseous transport medium into the conveying section for conveying the granulate from the outlet to the processing stations. The discharge preferably takes place using the first and the second transport medium. In addition, it has been found to be particularly advantageous to provide a simultaneous feed or at least substantially simultaneous feed of the first and the second transport medium.

Here as well, compressed air may preferably be used once again as the gaseous transport medium for transferring and also for discharging. However, the use of some other gas or gas mixture may also prove to be useful. In particular for reactive operating materials, the use of an inert gas, or at least one inert gas as a component of the transport medium, may also prove to be appropriate.

It has been found to be particularly advantageous to feed, at least intermittently, the first and the second gaseous transport medium simultaneously to the filling tower and to the conveying section in the open position of the transition element to allow discharge of the operating material from the outlet by means of the first and the second gaseous transport medium.

In one advantageous refinement, it is provided that the filling of the filling chamber with the operating material through the inlet takes place by means of a gaseous transport medium, so that a mixture of the operating material and the gaseous transport medium is fed through the inlet, the filling chamber preferably having an exhaust air opening which is preferably switchable between an open position and a closed position in order to discharge the gaseous transport medium which is used for filling the filling chamber, in particular to prevent back-pressure in the filling chamber, wherein a means for separating the operating material is provided which is designed and situated in such a way that separation of the operating material from the gaseous transport medium may be made possible, so that the operating material passes into the filling chamber and the gaseous transport medium escapes through the exhaust air opening in the open position of the exhaust air opening.

In particular a grid or screen situated in the filling chamber, in particular in the upper area of the filling chamber, may be used as a means for separating. Optionally, the means for separating may also be situated adjacent to, not in, the filling chamber. A means for cleaning the means for separating is also preferably provided in order to avoid plugging of the means for separating with the operating material and/or to allow cleaning of the means for separating. In one preferred embodiment, the gaseous transport medium which is used in particular for transferring the operating material from the filling chamber into the conveying section may be used as the means for cleaning in order to blow free, in a manner of speaking, the means for separating. For this purpose, the feed line of this gaseous transport medium may be provided in such a way that the means for separating is situated between the feed line and the conveying section, wherein the flow pattern of the gaseous transport medium is adjusted in such a way that it leads through the means for separating in the direction of the conveying section.

Accordingly, a further advantage is for the means for separating to be situated between a feed section for a gaseous transport medium and the conveying section in such a way that the gaseous transport medium, via which the operating material is transferred from the filling chamber into the conveying section in the open position of the transition element, flows through the means for separating during feeding and during transfer of the operating material, to allow an option for the means for separating to be cleaned by the gaseous transport medium.

In this regard, it has also been found to be particularly advantageous to use a supply store which has a storage chamber for the operating material for filling the filling chamber by means of a gaseous transport medium, the exhaust air opening being connected to a piping system which opens into the storage chamber to allow an option for ventilating the operating material, present in the storage chamber, by the gaseous transport medium which is discharged through the exhaust air opening. The supply store may be part of the device itself, but may also be a separate component of a system which in this case also includes the device according to the invention.

In one advantageous refinement, a means for closing the exhaust air opening and/or the inlet is provided, the means for closing having an actuator and being designed in such a way that the exhaust air opening and/or the inlet are/is able to close by a motion of the actuator in the flow direction of the gaseous transport medium or in the direction opposite thereto. Via such a means for closing, it is possible, for example, to minimize the risk of shearing off portions of the operating material by the actuator, so that in particular soiling of the means for closing may be prevented. One or more lift cylinders are preferably used as the means for closing, in particular to avoid shearing off of the operating material at the inlet.

A further advantage is the provision of a measuring device, in particular scales and/or a filling level sensor, in the filling chamber to detect the quantity or mass of operating material stored in the filling chamber. The device is preferably attached to a control unit or equipped with such, so that the values detected by the measuring device are processed, and further filling of the filling chamber with operating material is optionally controllable by use of the values.

In one advantageous embodiment, the filling chamber is dimensioned, and the measuring device for detecting the volume of the operating material filled into the filling chamber is designed, in such a way that a volume of approximately one-half liter of operating material can be reliably accommodated in the filling chamber, and that the measuring device is able to reliably detect this volume, optionally to control further filling of the filling chamber. It may also prove to be advantageous to adapt the filling chamber, in particular the diameter and the height of the filling chamber, in such a way that filling volumes of operating material of up to 15 liters may be accommodated in the filling chamber, which are then transferred to the conveying section and discharged via the outlet.

In one advantageous refinement, a means for closing the transition element between the filling chamber and the conveying section is provided, the means for closing having an actuator and being designed in such a way that the means is able to close the transition element by a motion of the actuator opposite to the transfer direction of the operating material from the filling chamber to the conveying section. In one preferred embodiment, a lift cylinder is used in particular to avoid shearing off of operating materials. In one advantageous refinement, the means for closing is provided in the lower area of the filling chamber or adjoins the lower area of the filling chamber, and is furthermore designed in such a way that a transition area which adjoins the lower area of the filling chamber is enabled when the transition element switches from the closed position into the open position, i.e., when the described actuator opens. Due to this expansion of the chamber by the transition areas which adjoin the lower area of the filling chamber, the operating material stored in the filling chamber may be provided, for example, with an option of settling or distributing, so that breaking up the operating material is made possible, which may result in simplified transport of the operating material by means of the gaseous transport medium described above.

In one advantageous refinement, the means for closing the transition element between the filling chamber and the conveying section is provided at the lower area of the filling chamber, the actuator having a funnel-shaped design on its side facing the filling chamber. In addition, it may prove useful for the cross section of the filling chamber to be larger than the cross section of the actuator, wherein the filling chamber in the lower area facing the means for closing has a funnel-shaped design such that in the open position of the transition element, i.e., when the actuator is open, an essentially continuous funnel extends from the lower area of the filling chamber over the funnel-shaped area of the actuator.

In one advantageous refinement, the lower area of the filling chamber facing the transition element has a funnel-shaped design and opens into the transition element.

A further basic concept of the present invention is the use of an output or processing system which comprises a device, described in detail above, for conveying an operating material such as a granulate, and a storage container for accommodating the operating material, the storage container being connected to the device via a feed line.

In one advantageous embodiment, it is also provided that the filling of the filling chamber of the device with the operating material from the storage container takes place by means of a gaseous transport medium, wherein the device has an exhaust air opening for discharging the gaseous transport medium, and a means for separating the operating material is provided which is designed in such a way that separation of the operating material from the gaseous transport medium is made possible, so that the operating material passes into the filling chamber and the gaseous transport medium escapes through the exhaust air opening, an exhaust air line which opens into the storage container being connected to the exhaust air opening. By such a design, the exhaust air from the device may be utilized, for example, for temperature control, in particular for cooling the operating material present in the storage container.

A further basic concept is the provision and use of an output system which comprises a device, described above, for conveying an operating material, and a storage container for accommodating the operating material, the storage container being connected to the device via a feed line. A further advantage is the use of a switch and/or one or more application units or processing stations, each of which is connected to the output opening of the device via one or more output lines.

In one advantageous refinement, the filling of the filling chamber of the device with the operating material from the storage container takes place by means of a gaseous transport medium, wherein the device has an exhaust air opening in order to discharge the gaseous transport medium, and a means for separating the operating material is provided which is designed in such a way that separation of the operating material from the gaseous transport medium is made possible, so that the operating material passes into the filling chamber and the gaseous transport medium escapes through the exhaust air opening, an exhaust air line which opens into the storage container being connected to the exhaust air opening.

In one particularly advantageous embodiment, a switch is connected to the output opening of the device via an output line, wherein multiple application units in turn are connected to the switch, so that by means of a device, a plurality of application units may be supplied with the operating material via the switch that is used.

BRIEF DESCRIPTION OF THE DRAWINGS

One exemplary embodiment of a device according to the invention is given in the appended figures, which show the following.

DETAILED DESCRIPTION

Figure 1:
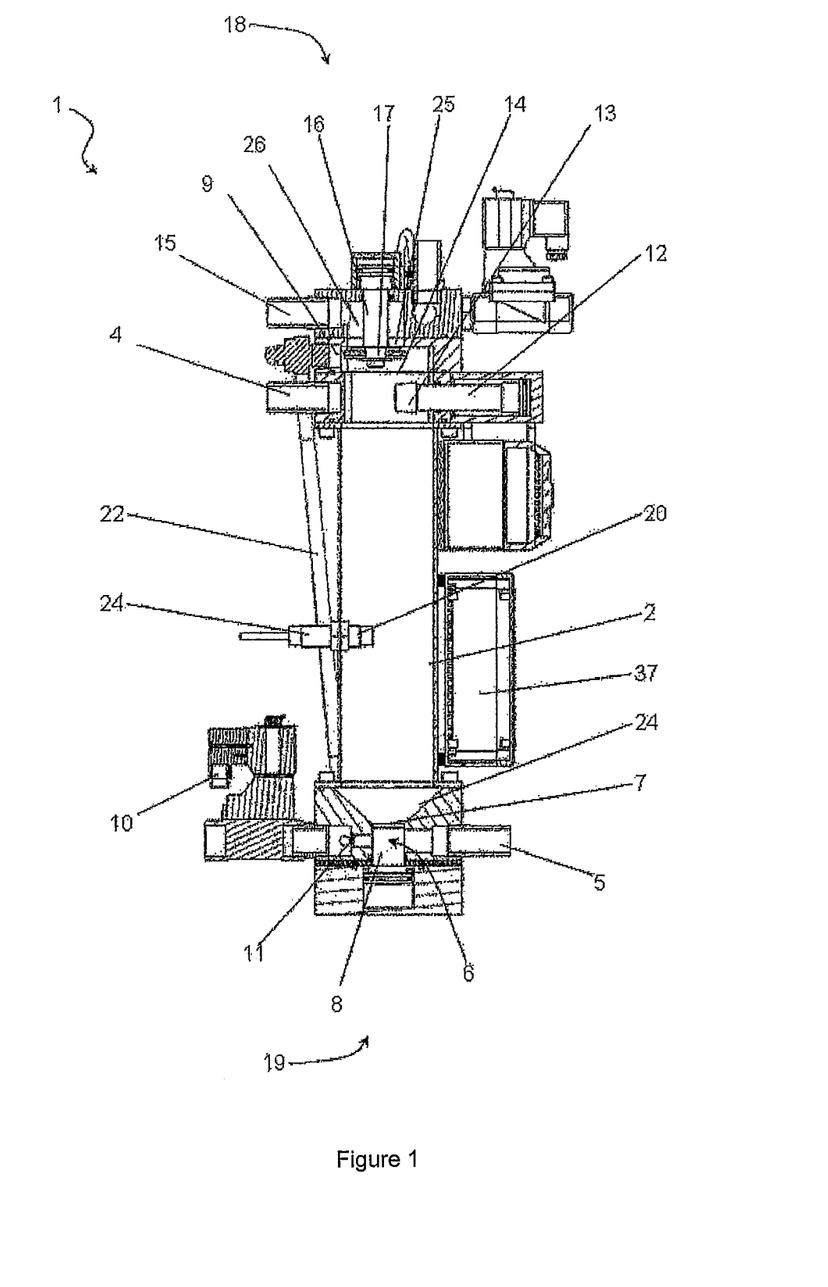
FIG. 1 shows a sectional view of a device according to the invention in the filling state.

FIG. 1 shows a sectional view of a filling device 1 according to the invention for conveying an operating material. Although the filling device 1 is suitable in principle for all pumpable operating materials, and thus, bulk materials, gel-like or pasty substances, or liquids, in the exemplary embodiment shown it is used for conveying hot melt adhesives for packaging machines, for example. The hot melt adhesive is provided as a bulk material, namely, in the form of a granulate, and stored in a supply store or storage tank, not illustrated, and from there conveyed by means of the filling device 1 to a packaging machine or hot melt adhesive machine, not illustrated, where the hot melt adhesive may be melted and applied. For this purpose, the filling device 1 has a housing 2 which in particular encloses a filling chamber 3. The filling chamber 3 is substantially cylindrical in the exemplary embodiment shown, but may have some other shape, and is used for accommodating the granulate. An inlet opening 4 via which the granulate may be supplied to the filling chamber 3 is provided at a head side 18 of the filling device 1. In the area of the base side 19 opposite from the head side 18, the filling device 1 also has an outlet opening 5 which is used for conveying the granulate from the filling device 1 in particular to the packaging machines or hot melt adhesive machines, not illustrated.

The filling chamber 3 is used in particular for preportioning a specified quantity of granulate. For this purpose, a filling level sensor 20 is provided which monitors the filling level of granulate filled into the filling chamber 3. The filling level sensor 20 is connected via a control connection, not shown, to a control unit 37, which in turn is able to process the data detected by the filling level sensor 20, and as a function thereof, to control the feed of the granulate into the filling chamber 3 via the inlet opening 4. However, additional or alternative measuring devices may be provided to monitor the quantity, in particular the volume or the weight, of the granulate introduced into the filling chamber 3. Thus, in particular the use of scales, not depicted, for the filling device 1 is conceivable in order to determine the additional weight due to the filling with granulate. In addition, the use of a photosensor or a camera which monitors the quantity of granulate present in the filling chamber 3, for example through an inspection window in the wall of the housing 2 of the filling chamber 3, may prove to be useful.

In the embodiment shown, the granulate passes through the inlet opening 4 in the filling chamber 3 by means of a gaseous transport medium. Compressed air is used as the gaseous transport medium, the granulate being conveyed through the inlet opening 4 into the filling chamber 3 by means of compressed air. However, in one alternative embodiment, suction intake of the granulate by means of a gaseous transport medium through the inlet opening 4 is possible, in particular by applying a vacuum. In the filling device 1 shown, however, the granulate is filled into the filling opening 4 by means of compressed air. An exhaust air opening 15 is provided on the housing 2 in the area of the head side 18, above the filling chamber 3 and the inlet opening 4, in order to discharge the gaseous transport medium required for conveying the granulate into the filling chamber 3 through an exhaust air slot 25, and through an adjoining exhaust air channel 26 which opens into the exhaust air opening 15 from the filling chamber 3. In addition, a separating screen 14 as a means for separating is provided within the housing 2 in the area of the head side 18, above the filling chamber 3 and between the inlet opening 4 and the exhaust air opening 15. The separating screen 14 extends over the entire free cross section within the housing 2, between the inlet opening 4 and the exhaust air opening 15, in such a way that the gaseous transport medium which is used for conveying the granulate into the filling chamber 3 is forced to flow through the separating screen 14 after flowing into the inlet opening 4, in order to reach the exhaust air opening 15. During the filling operation, preferably only the filling opening 4 for filling the filling chamber 3, and the exhaust air opening 15 for discharging the gaseous transport medium, are open. However, all other openings of the filling device 1 are closed, the closing preferably being controlled by the control unit 37. The separating screen 14 has a screen size which is selected in such a way that the granulate is separated from the gaseous transport medium, so that the granulate passes into the filling chamber 3 located below the separating screen 4, and the gaseous transport medium is able to escape through the exhaust air opening 15. The separating screen 14 preferably has an exchangeable design to be able to separate different particle sizes of granulate.

For closing the inlet opening 4, the filling device 1 has a lift cylinder 12 having an actuator 13 as a means for closing. The exhaust air opening 15, or rather, the exhaust air slot 25, may also be closed by means of a further lift cylinder 16 having an actuator 17 as a means for closing. Both lift cylinders 12, 16 are actuated by the control unit 37. However, other options for closing the openings of the filling device 1, in particular the inlet opening 4 and the exhaust air opening 15, which are suitable for the particular intended purpose and known to those skilled in the art may also be provided.

In the exemplary embodiment shown, attached to the exhaust air opening 15 is a piping system, not illustrated, via which the discharged gaseous transport medium is returned from the filling device 1 into the supply store, not illustrated, for the granulate, wherein the piping system opens into a storage chamber of the supply store so as to allow an option for ventilating the granulate, present in the storage chamber, via the gaseous transport medium which is discharged through the exhaust air opening 15. In this way, in particular cooling of the granulate present there and/or loosening of the granulate may be made possible.

In the area of the filling device 1 facing the base side 19, the filling chamber 3 opens via a funnel 24 into an opening, designed as a transition element 7, which in the state of the filling device 1 shown is closed by the actuator of a lift cylinder 8. The actuator of the lift cylinder 8 extends over a conveying section 6 which is used for conveying the granulate from the filling device 1 via the outlet opening 5. For this conveying, the filling device 1 also has a further connection for a gaseous transport medium, in the present case a compressed air connection 10 having a compressed air nozzle 11 directed onto or into the conveying section 6, for acting on the conveying section 6 with compressed air for conveying the granulate from the outlet 5. However, in the example shown, as discussed above, the filling chamber 3 is separated from the conveying section 6 by means of the actuator of the lift cylinder 8, which blocks or closes the transition element 7, so that granulate is not able to pass from the filling chamber 3 into the conveying section 6.

Figure 2:
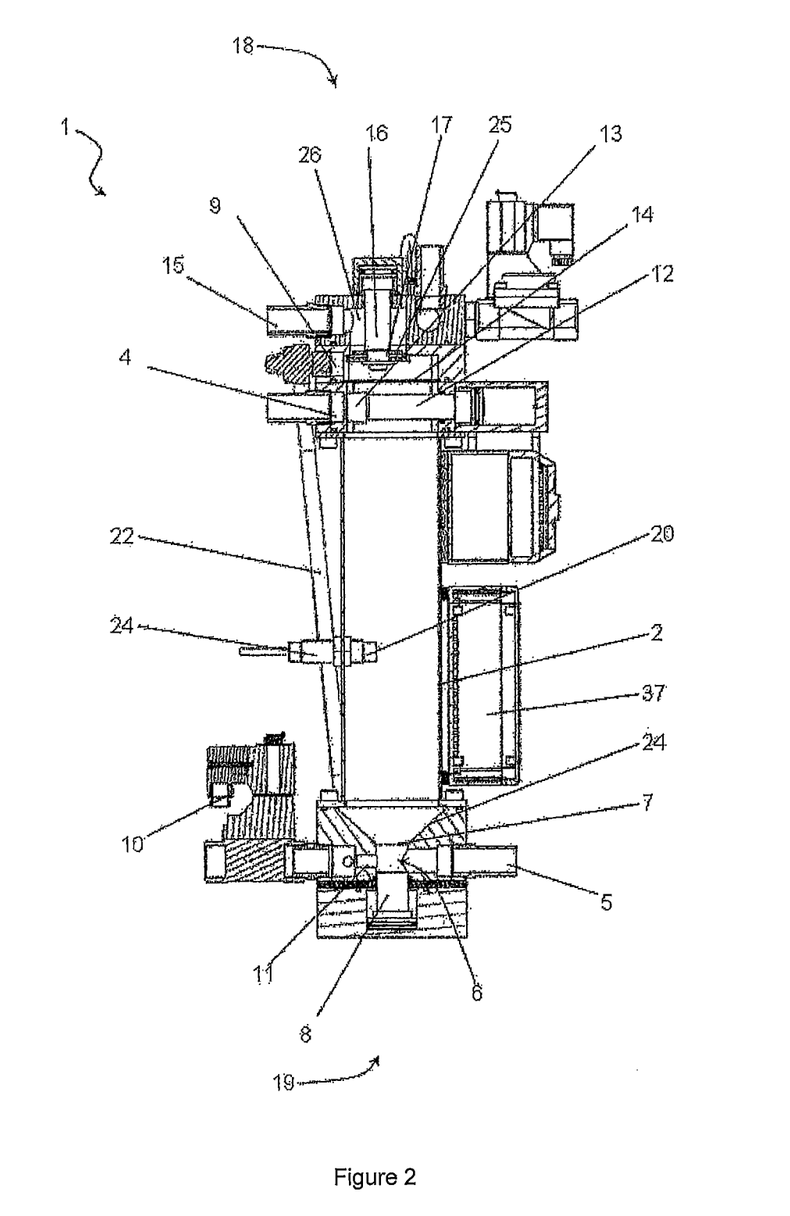
FIG. 2 shows a sectional view of the device from FIG. 1 in the output state.

FIG. 2 shows a sectional view of the filling device 1 from FIG. 1 in the output state. The above-described feed of the granulate through the inlet opening 4 into the filling chamber 3 is completed here. The feed of the granulate by means of the gaseous transport medium has taken place until the filling level sensor 20 has measured a specified filling volume of granulate in the filling chamber 3. The control unit 37 has then actively switched the feed of the granulate to the supply store or storage tank, not illustrated. However, the control unit 37 has at least activated the lift cylinder 12, situated in the housing 2, as the means for closing the inlet opening 4 which has a movable actuator 13, which is situated and designed in such a way that closing of the inlet opening 4 by a motion of the actuator 13 opposite to the flow direction of the gaseous transport medium during filling of the filling chamber 3 is made possible. In addition, the further lift cylinder 16 is provided with an actuator 17 in the area of the head side 18, above the separating screen 14, which is used for closing the exhaust air opening 15, the actuator 17 being designed in such a way that it has closed the exhaust air opening 15, or rather, the exhaust air slot 25, as a flow path to the exhaust air opening 15 by a motion of the actuator 16 opposite to the flow direction of the gaseous transport medium. Here as well, the activation of the lift cylinder 16 has taken place by means of the control unit 37 after detection of the specified filling volume in the filling chamber 3 by the filling level sensor 20.

In addition, the lift cylinder 8 has been activated by the control unit 37, and has been transferred from the closed state shown in FIG. 1, in which the actuator of the lift cylinder 8 has blocked the transition element 7, with the transition element 7 therefore in the closed position, into an open state in which the transition element 7 is enabled and therefore is in the open position. For this purpose, the motion of the actuator has taken place in a direction which extends from the head side 18 toward the base side 19. The motion of the actuator has taken place in such a way that the conveying section 6 situated below the transition element 7 and the filling chamber 3 has been enabled, as well as the compressed air nozzle 11 opening into the conveying section 6 and the outlet opening 5, opposite from the compressed air nozzle 11, which communicates with the conveying section 6 via an outlet channel. The compressed air nozzle 11 is used for acting on the conveying section 6 with a gaseous transport medium, in the present case compressed air, for discharging the granulate from the outlet opening 5.

The granulate which is filled into the filling chamber 3 through the inlet opening 4 can pass into the conveying section 6 through the transition element 7, which is now enabled. This may take place on the one hand by gravity, since the conveying section 6, as described above, is provided below the filling chamber 3. However, according to the invention a gaseous transport medium is used here. In the area of the head side 18, above the separating screen 14, the filling device 1 has a compressed air connection 9 through which compressed air as the gaseous transport medium for transferring the granulate from the filling chamber 3 into the conveying section 6 may be introduced into the filling chamber 3. Due to the arrangement above the separating screen 14, the compressed air which is introduced into the filling device 1 via the compressed air connection flows through the separating screen 14 in order to pass into the filling chamber 3, thus, in this case, in the direction opposite from the above-described exhaust air, which is led out from the filling device 1 through the separating screen 14 and then through the exhaust air opening 15, which is closed in FIG. 2. Cleaning of the separating screen 14 may be made possible due to this flowthrough, since any granulate particles lodged in the mesh are blown out and pass into the filling chamber 3. The compressed air flows further into the filling chamber 3, and from there transfers the granulate through the transition element 7, in the open position, into the conveying section 6. At the same time, pressure acts on the conveying section 6 by means of the compressed air nozzle 11 for conveying the granulate which has passed from the filling chamber 3 into the conveying section 6. In the exemplary embodiment shown, the connection of the nozzle 11 is joined to the above-described compressed air connection 9 via a pipe connection 22, so that the filling device 1 is supplied with compressed air via the nozzle 11 and at the same time, via the compressed air connection 9. Here as well, this is controlled once again by the control unit 37. Accordingly, the filling device is supplied via the compressed air connection 9 with a first gaseous transport medium in the filling chamber 3 for transporting the granulate into the conveying section 6, and is supplied via the nozzle 11 with a second gaseous transport medium in the conveying section 6 for conveying the granulate from the outlet opening 5.

As already mentioned above, the actuator of the lift cylinder 8 has been displaced in such a way that communication between the conveying section 6 and the outlet opening via the outlet channel is possible. The compressed air introduced into the conveying section 6 via the compressed air connection 9 and the nozzle 11 may thus escape via the outlet opening 5, and conveying of the granulate from the outlet opening 5 may be ensured. Accordingly, conveying of the granulate from the outlet opening 5 thus takes place not only by utilizing the compressed air introduced via the compressed air nozzle 11, but also by utilizing the compressed air which is supplied to the filling chamber 3 via the compressed air connection 9, and which has been used for transferring the granulate from the filling chamber 3 into the conveying section 6.

Figure 3:
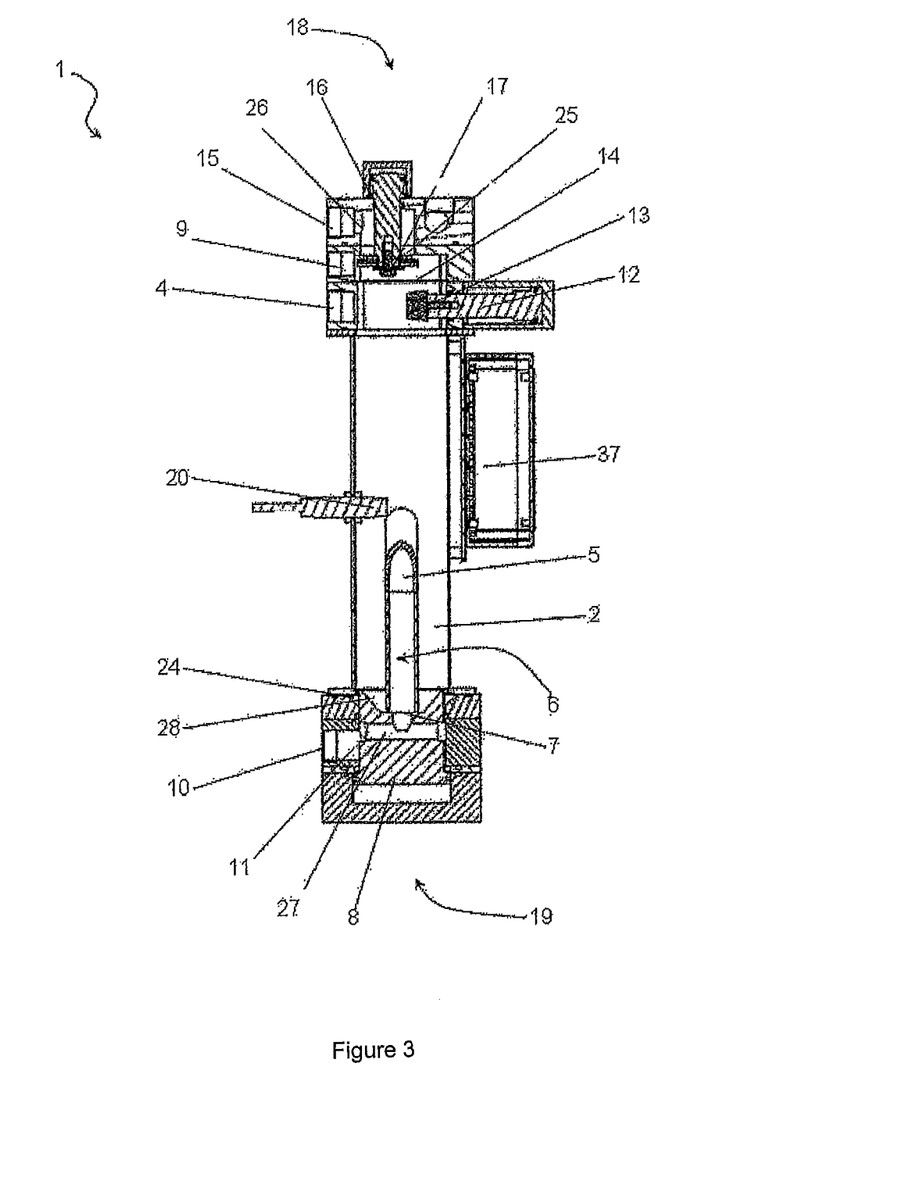
FIG. 3 shows a sectional view of an alternative device according to the invention in the filling state.

FIG. 3 shows a sectional view of an alternative filling device 1 according to the invention in the filling state. This filling device also has the head side 18 and the base side 19 in addition to the housing 2, which encloses the filling chamber 3 for accommodating a granulate. The function and the basic mode of operation correspond to the filling device 1 shown in FIGS. 1 and 2, so that the corresponding description passages are to be understood to also apply to this filling device 1. In particular the function, design, and arrangement of the inlet opening 4 with the lift cylinder 12 having the actuator 13, the separating screen 14, the exhaust air opening 15 with the lift cylinder 16 having the actuator 17, the compressed air connection 9, and the filling level sensor 20 correspond to those of the filling device 1 shown in FIGS. 1 and 2, so that reference is made here to the mentioned description passages.

One difference, however, is the conveying section 6 of the filling device 1 shown here. This conveying section extends as a substantially hollow cylindrical tube within the filling chamber 3, wherein the tube opens into a base segment in the direction of the head side 18, and opens from the filling chamber 3 into the outlet opening 5 in a side wall of the housing 2. In addition, the tube has an open design in the direction of the base side 19. The free area of the filling chamber between the conveying section 6 and the inner wall of the housing 2 is designed here as a transition element 7 via which the granulate is transferable from the filling chamber 3 into the conveying section 6.

The transition element 7 is in the closed state in FIG. 3. The transition element 7 is closed here by the actuator of a lift cylinder provided on the base side 19, so that communication between the filling chamber 3 and the conveying section 6 is not possible. The actuator of the lift cylinder 8 has a cross section which corresponds approximately to that of the filling chamber 3, and forms the base area of the filling chamber 3. For this purpose, the top side of the actuator has a funnel-shaped area 24. In addition, the actuator has a channel 27 with which communication of the compressed air nozzle 11 with the conveying section 6 for discharging the granulate from the output opening 5 may be made possible.

Figure 4:
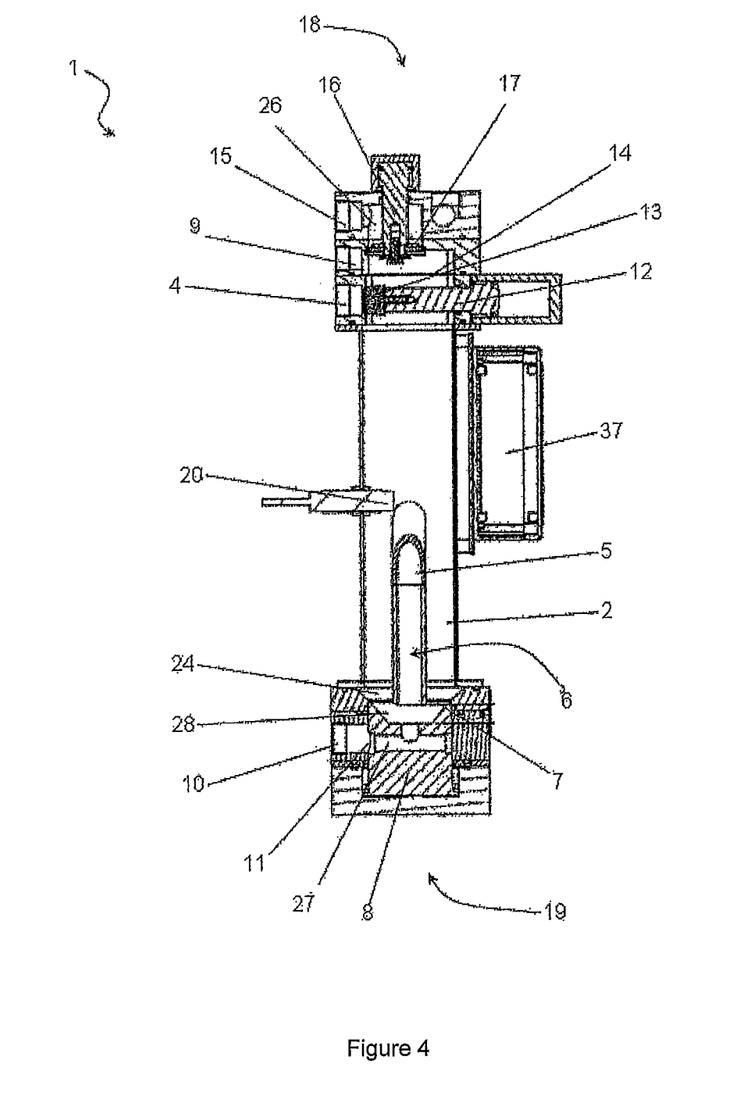
FIG. 4 shows a sectional view of the device from FIG. 3 in the output state.

Here as well, if the predetermined filling level of granulate in the filling chamber 3 has been reached, the inlet opening 4 and the exhaust air opening 15 are once again closed as described above. FIG. 4 shows a sectional view of the device from FIG. 3 in the output state. For transferring the granulate, the lift cylinder 8 is actuated by the control unit 37, so that the actuator thereof moves in the direction of the base side 19, i.e., opposite to the flow direction of the granulate, and enables the transition element 7. The transition element 7 is thus in the open position, so that communication between the filling chamber 3 and the conveying section 6 is possible. In this state, the funnel-shaped area 27 of the actuator forms a funnel 24 of the filling chamber 3 on the base side.

Coupling of the channel 27 with the compressed air nozzle 11 takes place due to the motion of the actuator. The channel 27 extends at an angle through the actuator in such a way that the channel opens on its top side and opposite from the inlet of the conveying section 6. Due to the action, described above, of compressed air by means of the compressed air connection 9 and the compressed air nozzle 11, on the one hand transfer of the granulate from the filling chamber 3 through the transition element 7, in the open position, into the conveying section 6 is possible. On the other hand, the granulate is likewise discharged from the outlet opening 5 via the conveying section 6. In addition, particularly good conduction of the granulate in the direction of the inlet of the conveying section 6 may be ensured by the funnel-shaped area 28. In particular, turbulence within the filling chamber 3 may be minimized by use of the funnel-shaped area 28.

Figure 5:
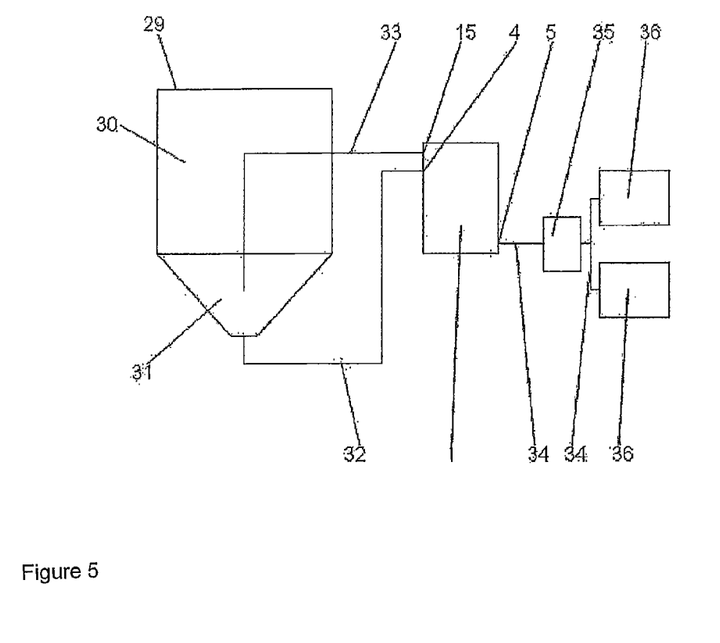
FIG. 5 shows a schematic view of an output system according to the invention.

FIG. 5 shows a schematic view of an output system 100 according to the invention, comprising a filling device 1, shown in FIGS. 1 to 4, for conveying a granulate, and a storage container 29 for accommodating the granulate and having a output funnel 31 on the base side, the storage container 19 being connected to the filling device 1 via a feed line 32. The filling of the filling chamber 3 of the filling device 1 with the granulate from the storage container 29 takes place by means of a gaseous transport medium, wherein the filling device has an exhaust air opening 15, described above, in order to discharge the gaseous transport medium, and a means for separating 14 the granulate is provided which is designed in such a way that separation of the granulate from the gaseous transport medium may be made possible, so that the granulate passes into the filling chamber 3 and the gaseous transport medium escapes through the exhaust air opening 15. According to the invention, an exhaust air line 33 is connected to the exhaust air opening 15 and opens into the storage container 29, the exhaust air being used for temperature control, in particular for cooling, of the granulate present in the storage container 29. In addition, a plurality of application units 36 is provided for melting and applying the granulate, the application units in turn being connected via an output line 34 to the outlet opening 5 of the filling device 1 by means of output lines 34 via a switch 35. Accordingly, a plurality of application units 34 may be supplied by means of a filling device 1, the distribution of the conveyed granulate taking place by means of the switch 35, which is actuatable, for example, via the control unit 37 of the application unit 1.

The embodiments of the invention described above are provided by way of example only. The skilled person will be aware of many modifications, changes and substitutions that could be made without departing from the scope of the present invention. The claims of the present invention are intended to cover all such modifications, changes and substitutions as fall within the spirit and scope of the invention.

What is claimed is:

1. A device for conveying an operating material, the device comprising:
    a head side opposing and physically separated from a base side,
    an inlet in the head side of the device fluidly connected to a filling chamber,
    a conveying section fluidly connected to the filling chamber and fluidly connected to an outlet,
    a transition element disposed between the filling chamber and the conveying section, the transition element switchable between an open condition and a closed condition, and
    an actuator physically displaceable between a first position and a second position to switch the transition element between the open condition and the closed condition, wherein the actuator in the first position is disposed between the base side and the outlet and the actuator in the second position is disposed between the outlet and the transition element,
    wherein when the transition element is in the open condition a mixture of a first gaseous transport medium and the operating material can move through the inlet and the operating material can further move into the filling chamber, past the open transition element, through the conveying section and into the outlet.

2. The device according to claim 1, wherein the first gaseous transport medium can be fed into the filling chamber for transporting the operating material into the conveying section, and a second gaseous transport medium can be fed into the conveying section for conveying the operating material away from the outlet.

3. The device according to claim 2, wherein the first and the second gaseous transport medium can be simultaneously fed, at least intermittently, to the filling chamber and to the conveying section in the open position of the transition element in order to allow discharge of the operating material from the outlet by means of the first and also the second gaseous transport medium.

4. The device according to claim 1, further comprising an exhaust air opening and a means for separating the gaseous transport medium from the operating material so that the operating material passes into the filling chamber and the gaseous transport medium flows through the means for separating and escapes through the exhaust air opening.

5. The device according to claim 4, wherein the means for separating is situated between a feed section for a gaseous transport medium and the conveying section in such a way that the gaseous transport medium can alternatively flow through the means for separating to allow an option for the means for separating to be cleaned of operating material by the gaseous transport medium.

6. The device according to claim 4, further comprising a storage chamber for the operating material for filling the filling chamber by means of a gaseous transport medium, wherein the exhaust air opening is fluidly attached to the storage chamber to optionally allow ventilating the operating material present in the storage chamber by the gaseous transport medium which is discharged through the exhaust air opening.

7. The device according to claim 4, wherein a means for closing the exhaust air opening and/or the inlet is provided, wherein the means for closing has an actuator and is designed in such a way that the means for closing is able to close the exhaust air opening and/or the inlet by a motion of the actuator in the flow direction of the gaseous transport medium or in the direction opposite thereto.

8. The device according to claim 1, wherein the actuator moves in a direction opposite to the transfer direction of the operating material from the filling chamber to the conveying section to switch the transition element to the closed position.

9. The device according to claim 2, further comprising an exhaust air opening and a means for separating the gaseous transport medium from the operating material, wherein the mixture of first gaseous transport medium and the operating material is separated by the means for separating so that the operating material passes into the filling chamber and the gaseous transport medium escapes through the exhaust air opening.

10. The device according to claim 3, further comprising an exhaust air opening and a means for separating gaseous transport medium from the operating material wherein the mixture of gaseous transport medium and the operating material is separated by the means for separating so that the operating material passes into the filling chamber and the gaseous transport medium escapes through the exhaust air opening.

11. The device according to claim 5, further comprising a storage chamber for the operating material for filling the filling chamber by means of a gaseous transport medium, wherein the exhaust air opening is fluidly attached to the storage chamber to optionally allow ventilating the operating material present in the storage chamber by the gaseous transport medium which is discharged through the exhaust air opening.

12. The device according to claim 5, wherein a means for closing the exhaust air opening and/or the inlet is provided, wherein the means for closing has an actuator and is designed in such a way that the means for closing is able to close the exhaust air opening and/or the inlet by a motion of the actuator in the flow direction of the gaseous transport medium or in the direction opposite thereto.

13. The device according to claim 6, wherein a means for closing the exhaust air opening and/or the inlet is provided, wherein the means for closing has an actuator and is designed in such a way that the means for closing is able to close the exhaust air opening and/or the inlet by a motion of the actuator in the flow direction of the gaseous transport medium or in the direction opposite thereto.

14. The device according to claim 2, wherein the actuator moves in a direction opposite to the transfer direction of the operating material from the filling chamber to the conveying section to switch the transition element to the closed position.

15. The device according to claim 3, wherein the actuator moves in a direction opposite to the transfer direction of the operating material from the filling chamber to the conveying section to switch the transition element to the closed position.

16. The device according to claim 4, wherein the actuator moves in a direction opposite to the transfer direction of the operating material from the filling chamber to the conveying section to switch the transition element to the closed position.

17. The device according to claim 5, wherein the actuator moves in a direction opposite to the transfer direction of the operating material from the filling chamber to the conveying section to switch the transition element to the closed position.

18. A device for conveying an operating material, the device comprising:
   an inlet in a head side of the device fluidly connected to a filling chamber,
   a conveying section fluidly connected to the filling chamber and fluidly connected to an outlet, and
   a transition element disposed between the filling chamber and the conveying section, the transition element movable between an open position and a closed position, and
   a screen for separating the gaseous transport medium from the operating material so that the operating material passes into the filling chamber
   wherein when the transition element is in the open position a mixture of a first gaseous transport medium and the operating material can move through the inlet and the operating material can further move into the filling chamber, past the open transition element, through the conveying section and into the outlet and further comprising an actuator physically displaceable between a first position and a second position to switch the transition element between the open condition and the closed condition.

* * * * *

UNITED STATES PATENT AND TRADEMARK OFFICE
CERTIFICATE OF CORRECTION

PATENT NO.       : 9,688,486 B2
APPLICATION NO.  : 14/654048
DATED            : June 27, 2017
INVENTOR(S)      : Andreas Henke It is certified that error appears in the above-identified patent and that said Letters Patent is hereby corrected as shown below:

Column 2, Line 61: Change "transferable" to -- transferrable --.

Signed and Sealed this
Fifth Day of June, 2018

Andrei Iancu
*Director of the United States Patent and Trademark Office*